United States Patent
Line et al.

(10) Patent No.: US 9,333,882 B2
(45) Date of Patent: May 10, 2016

(54) MANUAL UPPER SEATBACK SUPPORT

(71) Applicant: Ford Global Technologies, LLC, Dearborn, MI (US)

(72) Inventors: Johnathan Andrew Line, Northville, MI (US); Christian J. Hosbach, Allen Park, MI (US); Brian John Roorda, Farmington Hills, MI (US); Brandon W. Nichols, Hillsdale, MI (US); Mandeep Singh Sidhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/505,675

(22) Filed: Oct. 3, 2014

(65) Prior Publication Data

US 2016/0096449 A1    Apr. 7, 2016

(51) Int. Cl.
*B60N 2/22* (2006.01)

(52) U.S. Cl.
CPC .............. *B60N 2/2222* (2013.01); *B60N 2/224* (2013.01)

(58) Field of Classification Search
CPC ............ A47C 7/402; A47C 7/48; A47C 7/40; A47C 7/405; A47C 7/44
USPC .......................... 297/354.11, 367 R, 372, 376
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |

(Continued)

FOREIGN PATENT DOCUMENTS

| | | |
|---|---|---|
| EP | 0518830 A1 | 12/1992 |
| EP | 0754590 | 1/1997 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Laurie K Cranmer
(74) *Attorney, Agent, or Firm* — Vichit Chea; Price Heneveld LLP

(57) ABSTRACT

A vehicle seating assembly includes a lower seatback. An upper seatback is operably coupled to the lower seatback. The upper seatback is pivotally mounted to the lower seatback at a pivot axis. A manual articulation assembly operably couples the lower seatback with the upper seatback. The manual articulation assembly includes a housing member having a cam channel and an inner wall with a plurality of engagement recesses. A positional cam includes a cam pin engaged with the cam channel and an outer wall with a plurality of engagement teeth in removable engagement with the plurality of engagement recesses.

15 Claims, 16 Drawing Sheets

(56) References Cited

U.S. PATENT DOCUMENTS

| | | | |
|---|---|---|---|
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A * | 11/1998 | Karschin et al. | 297/216.14 |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 * | 11/2001 | Eklind | 297/216.15 |
| 6,364,414 B1 | 4/2002 | Specht | |
| 6,375,269 B1 | 4/2002 | Maeda et al. | |
| 6,390,557 B1 * | 5/2002 | Asano | 297/367 R |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,530,622 B1 | 3/2003 | Ekern et al. | |
| 6,550,856 B1 | 4/2003 | Ganser et al. | |
| 6,565,150 B2 | 5/2003 | Fischer et al. | |
| 6,565,153 B2 | 5/2003 | Hensel et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 * | 12/2010 | Yamada et al. | 297/284.1 |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 * | 7/2012 | Mizoi | 297/284.4 |
| 8,342,607 B2 | 1/2013 | Hofmann et al. | |
| 8,403,410 B1 | 3/2013 | Pinger et al. | |
| 8,899,683 B2 * | 12/2014 | Ito | 297/354.11 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 * | 10/2010 | Tanaka et al. | 297/354.11 |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |

(56) References Cited

U.S. PATENT DOCUMENTS

| | | |
|---|---|---|
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0119715 A1 | 5/2013 | Medoro et al. |

FOREIGN PATENT DOCUMENTS

| | | | |
|---|---|---|---|
| EP | 0921033 A2 | 6/1999 | |
| EP | 0926969 | 1/2002 | |
| EP | 1266794 | 3/2004 | |
| EP | 1123834 | 10/2004 | |
| EP | 1050429 | 10/2005 | |
| EP | 1084901 | 6/2006 | |
| EP | 1674333 | 8/2007 | |
| EP | 1950085 | 12/2008 | |
| EP | 1329356 | 11/2009 | |
| EP | 2534979 A1 | 12/2012 | |
| EP | 2574498 A1 | 4/2013 | |
| JP | 201178557 A | 4/2011 | |
| WO | WO9511818 | 5/1995 | |
| WO | WO9958022 | 11/1999 | |
| WO | WO2006131189 | 12/2006 | |
| WO | WO 2007009893 A2 * | 1/2007 | A47C 1/026 |
| WO | WO2007028015 | 8/2007 | |
| WO | 2008019981 A1 | 2/2008 | |
| WO | WO2008073285 | 6/2008 | |
| WO | WO2011021952 | 2/2011 | |
| WO | WO2012008904 | 1/2012 | |
| WO | 2013/040085 A2 | 3/2013 | |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/41691 (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

MANUAL UPPER SEATBACK SUPPORT

FIELD OF THE DISCLOSURE

The present disclosure generally relates to a vehicle seating assembly with a seatback support, and more particularly to a vehicle seating assembly with a manual upper seatback support.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seating assembly includes a lower seatback. An upper seatback is operably coupled to the lower seatback. The upper seatback is pivotally mounted to the lower seatback at a pivot axis. A manual articulation assembly operably couples the lower seatback with the upper seatback. The manual articulation assembly includes a housing member having a cam channel and an inner wall with a plurality of engagement recesses. A positional cam includes a cam pin engaged with the cam channel and an outer wall with a plurality of engagement teeth in removable engagement with the plurality of engagement recesses.

According to another aspect of the present disclosure, a vehicle seating assembly includes a lower seatback and an upper seatback. An articulation assembly pivotally couples the lower seatback with the upper seatback. The manual articulation assembly includes a housing member having a cam channel and an inner wall with a plurality of engagement recesses. A positional cam includes a cam pin engaged with the cam channel and an outer wall with a plurality of engagement teeth engaged with the plurality of engagement recesses.

According to yet another aspect of the present disclosure, a vehicle seating assembly includes a lower seatback. An upper seatback is operably coupled to the lower seatback. The upper seatback is pivotally mounted to the lower seatback at a pivot axis. A manual articulation assembly is coupled to and disposed between the lower seatback and the upper seatback and is configured to temporarily lock the upper seatback at one of a plurality of angled positions relative to the lower seatback.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
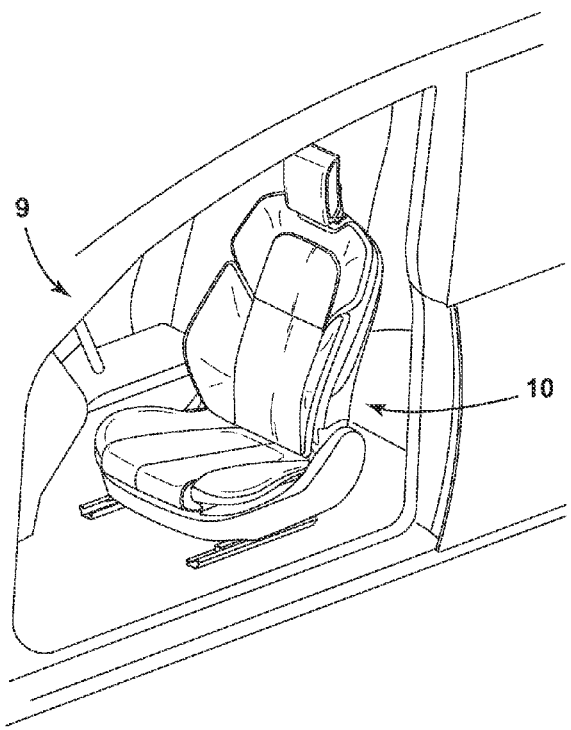
FIG. 1 is a top perspective view of one embodiment of a vehicle seating assembly in a vehicle of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-17B, reference numeral 9 generally designates a vehicle having a vehicle seating assembly 10 that includes a lower seatback 12. An upper seatback 14 is operably coupled to the lower seatback 12. The upper seatback 14 is pivotally mounted to the lower seatback 12 at a pivot axis 16. An arcuate back support bar 18 is disposed in the upper seatback 14 and is configured to rotate the upper seatback 14 between forward and rearward positions. The arcuate back support bar 18 includes first and second generally linear members 20, 22 and an arcuate intermediate portion 24 disposed between the first and second generally linear members 20, 22. An articulation assembly operably couples the lower seatback 12 with the upper seatback 14.

With reference again to FIG. 1, the illustrated vehicle seating assembly 10 is configured for use in a vehicle of any type, including, without limitation, cars, vans, trucks, buses, etc. The vehicle seating assembly 10 is suspended on rails that allow movement of the vehicle seating assembly 10 in fore and aft directions. In addition, the vehicle seating assembly 10 may include a variety of comfort controls, including, for example, thigh support using independent thigh bolsters 30, lumbar support, and upper thoracic support. The vehicle seating assembly 10 includes a head restraint 32 that is disposed on the upper seatback 14. The head restraint 32 is movable between forward and rearward positions to accommodate various sized heads of passengers, as well as different heights of passengers. The vehicle seating assembly 10 also includes controls specifically configured to adjust an upper thoracic portion 34 of the upper seatback 14.

Figure 3:
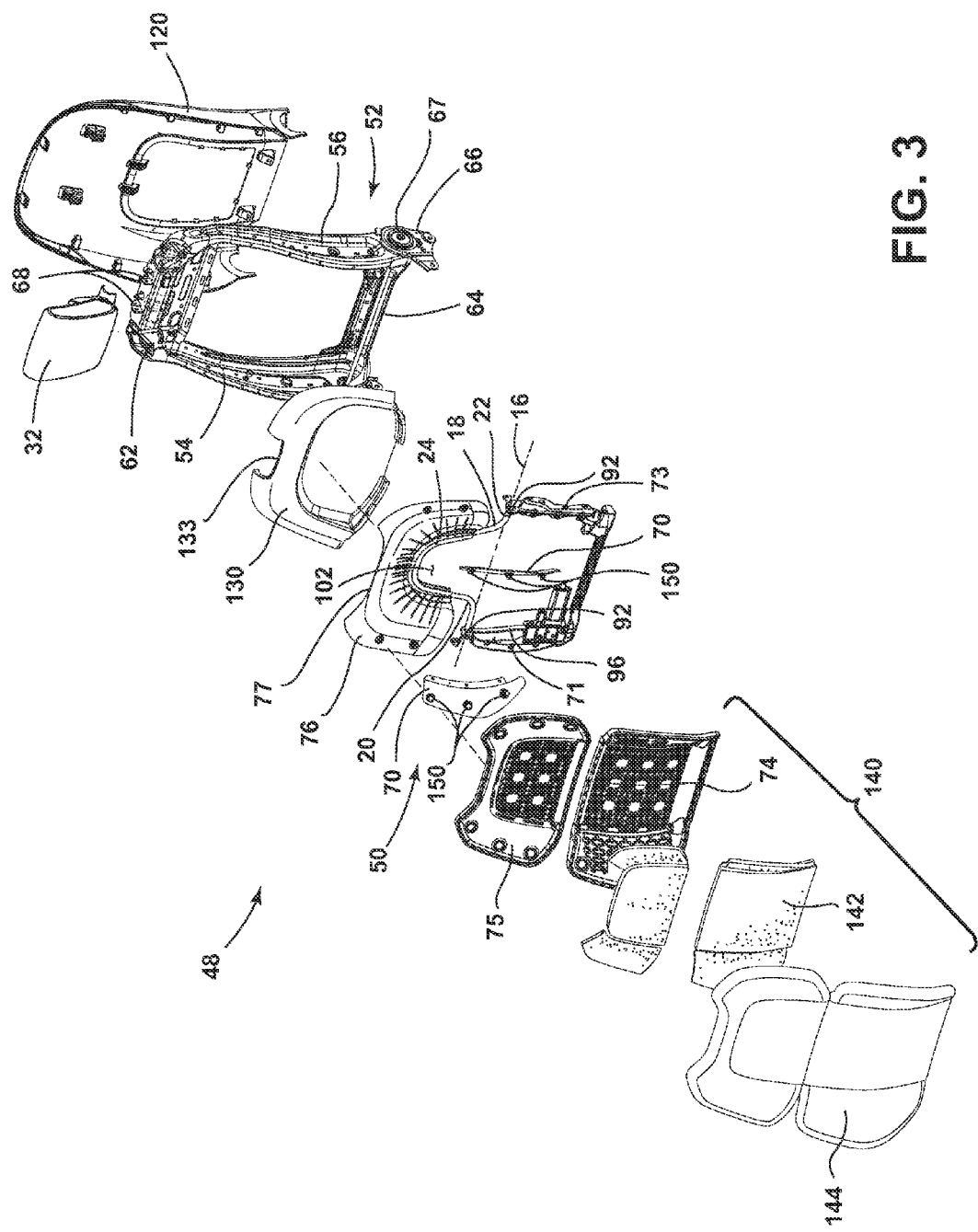
FIG. 3 is an exploded top perspective view of a seatback suspension system of the vehicle seating assembly of FIG. 1.

With reference to FIG. 3, the vehicle seating assembly 10 includes a seatback assembly 48 with a seatback suspension system 50 supported on a frame 52. The frame 52 of the seatback assembly 48 of the vehicle seating assembly 10 includes a first side support 54 and a second side support 56 that define the frame 52. The first and second side supports 54, 56 of the frame 52 pivotally couple with a rear portion of a seat 60 and extend upward from the seat 60 to a top portion of the seatback assembly 48 and connect with an upper lateral brace 62. The upper lateral brace 62 of the seatback assembly 48 extends between the first and second side supports 54, 56. The head restraint 32 is operably coupled with the upper lateral brace 62 of the seatback assembly 48 and is substantially centered between the first and second side supports 54, 56. The upper lateral brace 62, as well as a lower lateral brace 64, of the seatback suspension system 50 are coupled with and span between the first and second side supports 54, 56, such that the seatback suspension system 50 is positioned generally between the head restraint 32 and the seat 60 to support the back of a passenger. It is contemplated that the head restraint 32 may be integrated with the top portion of the seatback assembly 48 or that the head restraint 32 may otherwise not be included on the vehicle seating assembly 10.

Referring again to FIG. 3, the first and second side supports 54, 56 extend upward from a recliner heart bracket 66 having a recliner heart 67 that pivotally couples the seatback assembly 48 with the seat 60. The first and second side supports 54, 56 are substantially parallel with each other and curve upward and rearward from the recliner heart bracket 66 to provide a curved shape that complements the shape of the spinal column of a passenger. Further, the first and second side supports 54, 56 are thicker and more robust proximate the recliner heart bracket 66 and taper as they extend upward to couple with the upper lateral brace 62 that extends orthogonally between the first and second side supports 54, 56. The upper lateral brace 62 of the frame 52 includes connectors 68 for securing the head restraint 32 at a central portion of the upper lateral brace 62 centrally between the first and second side supports 54, 56. The connectors 68 are defined by upward protruding tabs configured to couple with the head restraint 32.

Figure 2:
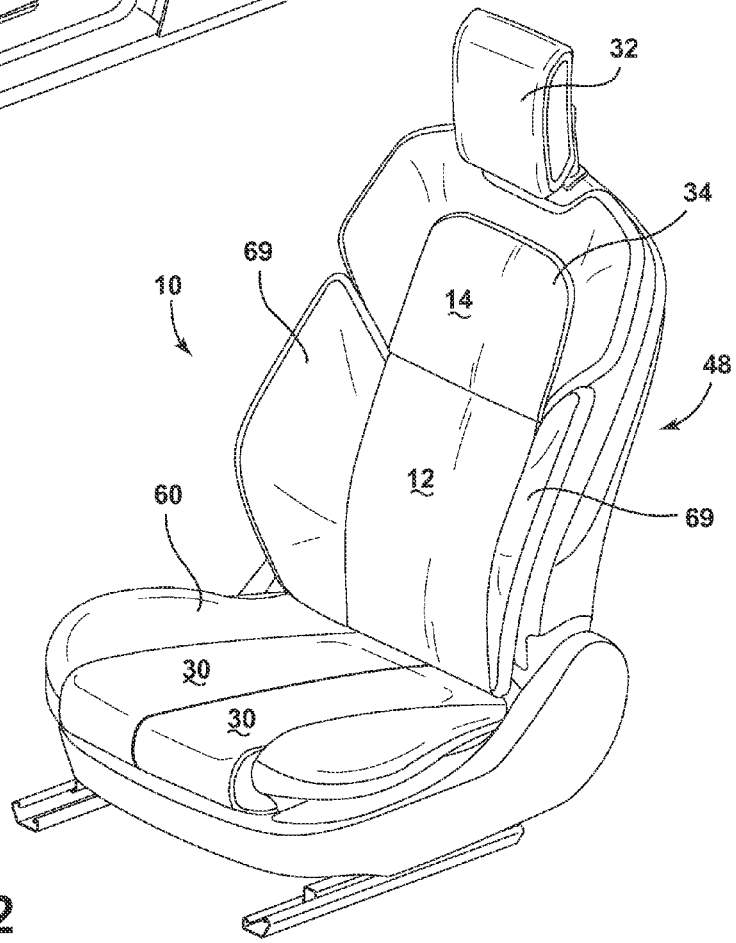
FIG. 2 is an enlarged top perspective view of the vehicle seating assembly of FIG. 1.

With reference again to FIGS. 3-7, the lower seatback 12 of the seatback suspension system 50, as shown in FIG. 3, includes flex members 70 extending from each of a first side connector 71 and a second side connector 73 of the seatback assembly 48. The first and second side connectors 71, 73 are operably coupled with and support side bolsters 69 (FIG. 2). The lower seatback 12 is positioned adjacent to the seat 60 and includes a lower comfort carrier 74 that supports the lower back of a passenger. Similarly, the upper seatback 14 of the seatback assembly 48 has an upper comfort carrier 75 operably coupled with a curved flex member 76 operably coupled with the arcuate back support bar 18. The flex member 76 of the upper lateral brace 62 is disposed above the first and second side connectors 71, 73. The flex member 76 includes a recess 77 in a top portion thereof configured to adequately space the flex member 76 from the head restraint 32. The flex member 76 also includes a plurality of outwardly extending reinforcement flanges 81. The curved flex member 76 includes three connecting features 83 that work as snap-fit connecting arrangements to secure the upper comfort carrier 75 with the curved flex member 76. In the illustrated embodiment, the arcuate back support bar 18 is coupled with the flex member 76 via a friction-fit engagement. Other connecting arrangements are also contemplated. It is conceivable that the lower and upper seatbacks 12, 14 may be integrated into a single component or several components spanning the seatback assembly 48.

The flex member 76 of the upper seatback 14 of the seatback suspension system 50, as shown in FIGS. 4-7, generally defines a support basket that supports the upper back of a passenger. The flex member 76 of the upper lateral brace 62 is coupled with the arcuate back support bar 18 that laterally extends between the first and second side supports 54, 56 of the frame 52. The arcuate back support bar 18 is pivotally coupled relative to pivot pins 92 to allow the flex member 76 to pivot forward and rearward about the pivot axis 16. Further, the arcuate back support bar 18 is operably coupled with a motor 94 via a linking member 96 to adjustably rotate the arcuate back support bar 18. Consequently, the upper seatback 14 can be pivoted forward and rearward relative to a plurality of angled positions to the lower seatback 12 and the frame 52, as described in more detail below.

With reference again to FIGS. 3-6, the pivot pins 92 generally define the pivot axis 16. The upper seatback 14 includes a forward articulating portion 100 that is operably coupled to the lower seatback 12. More specifically, the forward articulating portion 100 is pivotally mounted to the lower seatback 12 at the pivot axis 16. The arcuate back support bar 18 is disposed in the upper seatback 14 and configured to rotate the upper seatback 14 between forward and rearward positions. The arcuate back support bar 18 includes a generally U-shaped configuration. The first and second generally linear members 20, 22 and the arcuate intermediate portion 24 generally define a central open space 102 in the seatback assembly 48. An articulation assembly 110 operably couples the forward articulating portion 100 of the upper seatback 14 with the seatback assembly 48 and allows for movement between the forward and rearward positions. Notably, the flex member 76 or support basket may be fastened to the arcuate intermediate portion 24 of the arcuate back support bar 18, or may be overmolded directly onto the arcuate intermediate portion 24. The arcuate back support bar 18 is connected to brackets 112 that extend forward relative to the first and second generally linear members 20, 22 of the arcuate back support bar 18. The arcuate back support bar 18 is configured to rotate about a forward portion of the brackets 112 at the pivot pins 92. Consequently, the entire upper seatback 14 can be rotated about a forward portion of the brackets 112.

The seatback suspension system 50, as shown in FIG. 3, includes the frame 52, which may be constructed of metal or other rigid material, and a hard back panel 120 configured to substantially enclose a rear portion of the frame 52. The vehicle seating assembly 10 also includes a front trim panel 130. The front trim panel 130, together with the hard back panel 120, generally define a shell that covers the frame 52 of the seatback assembly 48. The hard back panel 120 couples with the frame 52 to substantially enclose a rear portion of the frame 52. Similarly, the front trim panel 130 couples with a front portion of the frame 52 to enclose a top front portion of the frame 52. The front trim panel 130 includes a mounting cutaway 133 for accommodating the head restraint 32, which extends therethrough to couple with the upper lateral brace 62 of the frame 52. The front trim panel 130 and the hard back panel 120 also engage the frame 52 proximate the upper lateral brace 62, the first side support 54, and the second side support 56, substantially enclosing an edge portion of the frame 52. The front trim panel 130 and hard back panel 120 are typically molded with a polymer material and the frame 52 is constructed substantially of steel, aluminum, or another substantially rigid metal. It is conceivable that alternative materials or forming methods may be used for the shell and the frame 52. In addition, the shell, or portions thereof, may conceivably be integrated with the frame 52.

Referring once again to FIG. 3, the upper seatback 14 and lower seatback 12 of the seatback suspension system 50 are configured to operably couple with a passenger cushion assembly 140. More specifically, the flex members 70, 76 on the lower seatback 12 and upper seatback 14, respectively, extend forward to engage and support the back of a passenger. The passenger cushion assembly 140 includes the lower comfort carrier 74, the upper comfort carrier 75, a cushion assembly 142, and a coverstock 144. The flex members 70, 76 operably couple to the lower comfort carrier 74 and the upper comfort carrier 75 in a snap-fit and friction-fit arrangement. The cushion assembly 142 is disposed between the lower comfort carrier 74 and the upper comfort carrier 75 and the coverstock 144 and between the lower comfort carrier 74 and the coverstock 144. It is conceivable that the passenger cushion assembly 140 may include more or fewer layers between the coverstock 144 and the upper comfort carrier 75. Further, it is conceivable that the passenger cushion assembly 140 may be one integral piece with the flex members 70, 76 of the seatback suspension system 50.

As shown in FIG. 3, the flex members 70 each include three connecting features 150 arranged longitudinally and in alignment with complementary features on first and second side connectors 71, 73 of the lower seatback 12 for fastening the flex members 70 of the lower seatback 12 to the passenger cushion assembly 140. The flex members 70 of the lower seatback 12 extend forward and outward from the seatback assembly 48 to create an external peripheral gap 152. The pivot pins 92 pivotally couple with the first and second side connectors 71, 73, generally above the lower lateral brace 64.

Figure 4:
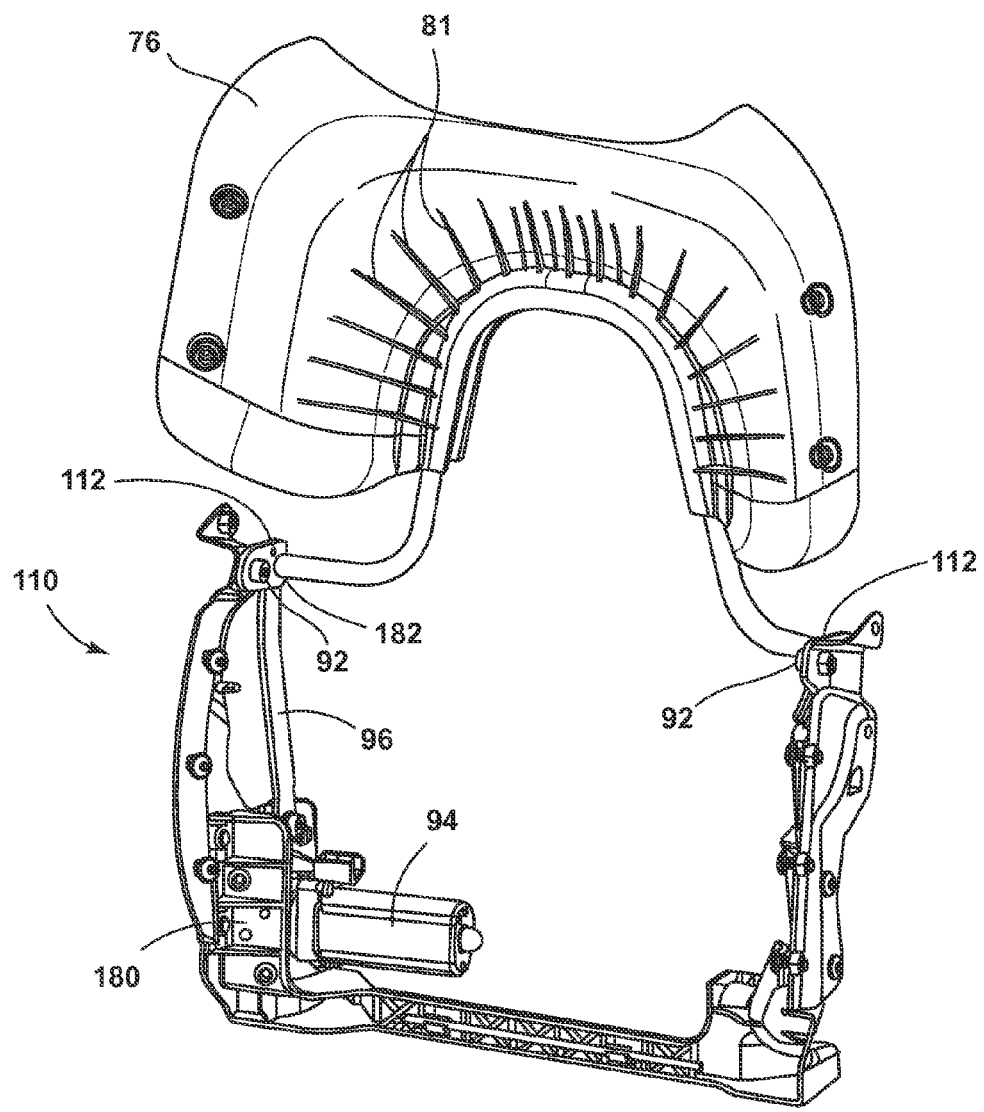
FIG. 4 is a rear perspective view of the seatback suspension system of FIG. 3.
Figure 5:
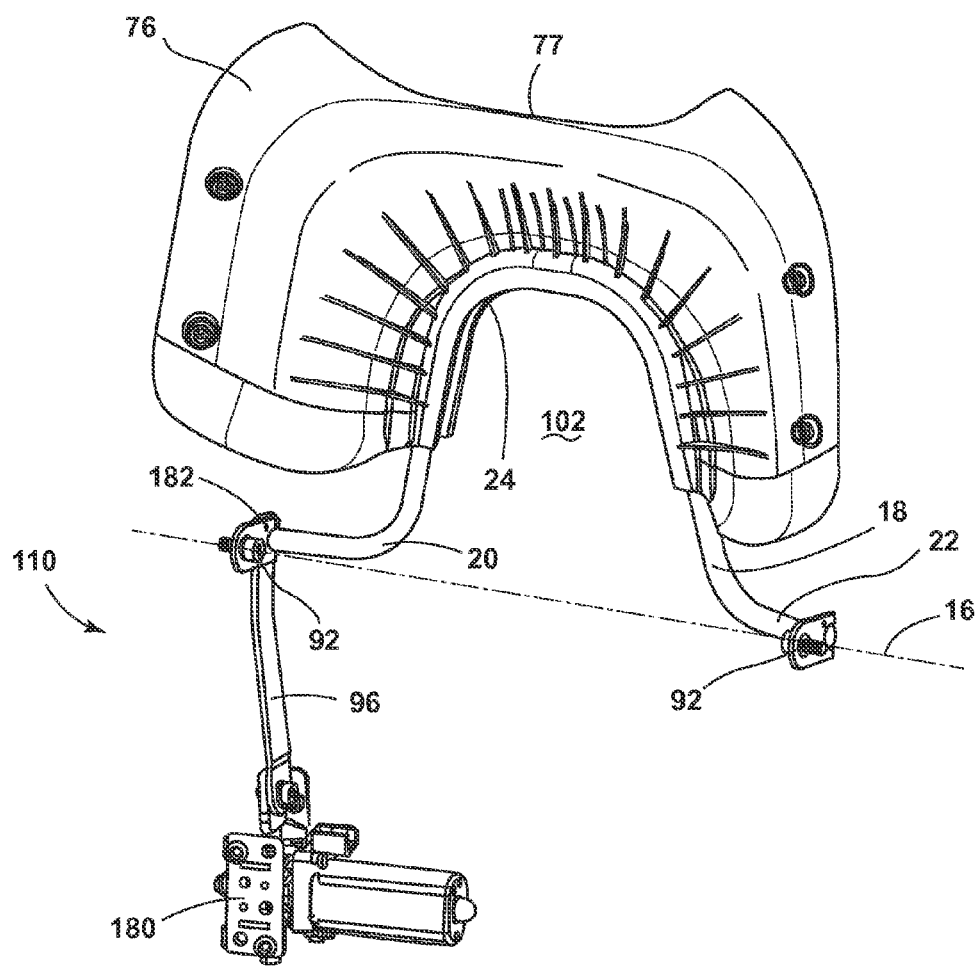
FIG. 5 is a rear perspective view of an upper seatback of the seatback suspension system of FIG. 3 with a linking member.
Figure 6:
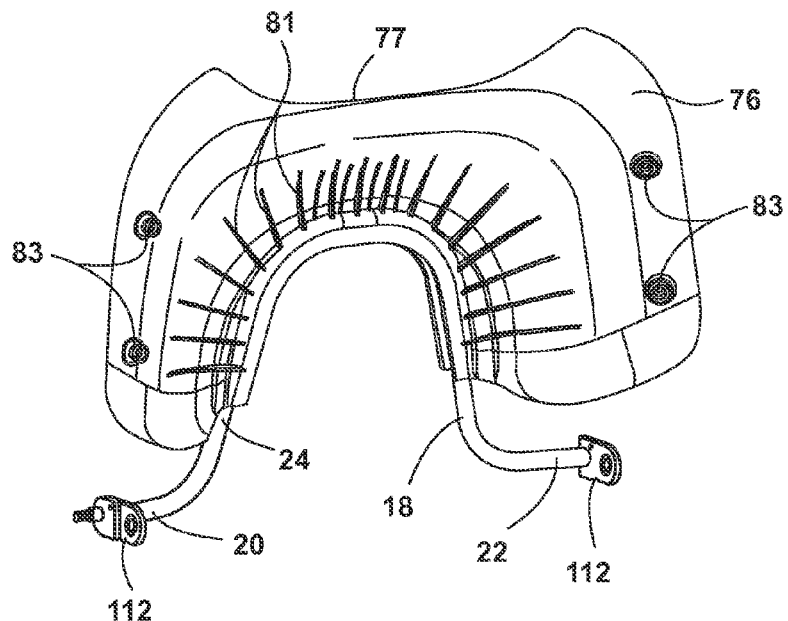
FIG. 6 is a rear perspective view of the upper seatback of FIG. 5 with brackets.
Figure 7:
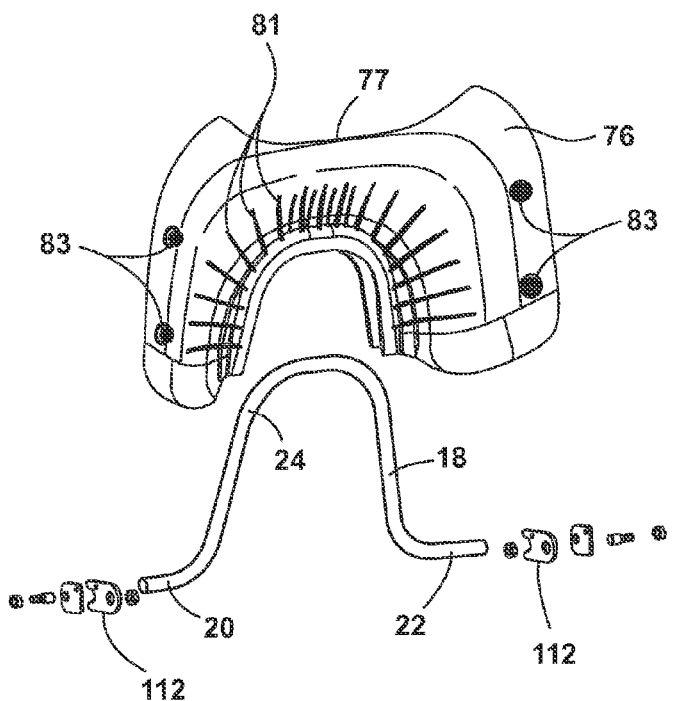
FIG. 7 is a rear perspective view of the upper seatback of FIG. 5 with a support bar.
Figure 8:
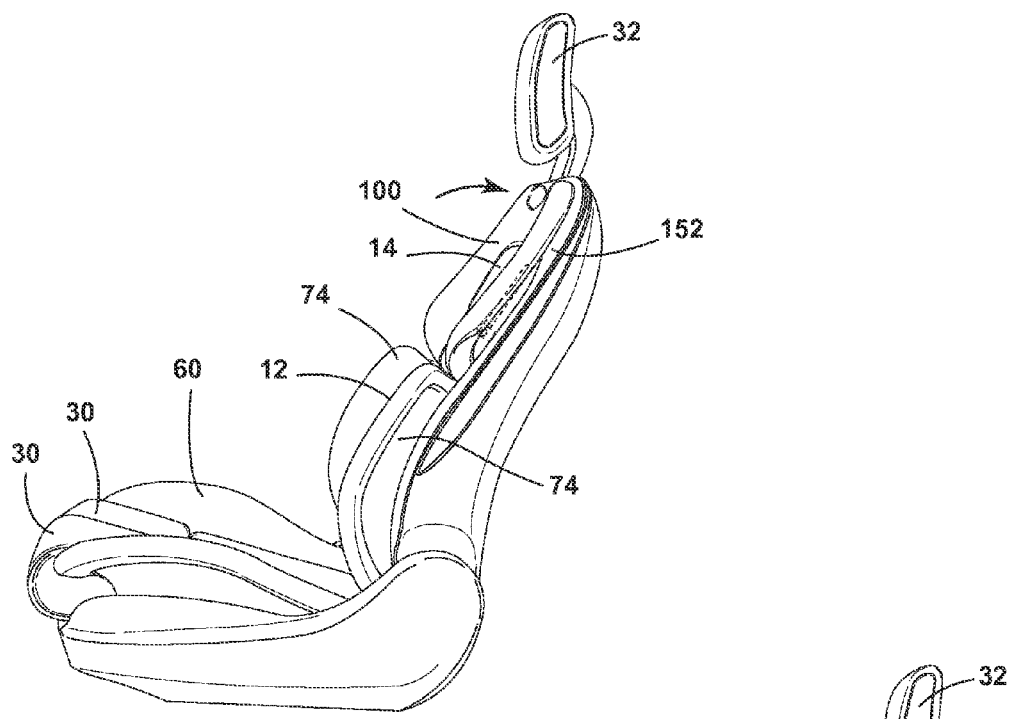
FIG. 8 is a side elevational view of the vehicle seating assembly of FIG. 2.
Figure 9:
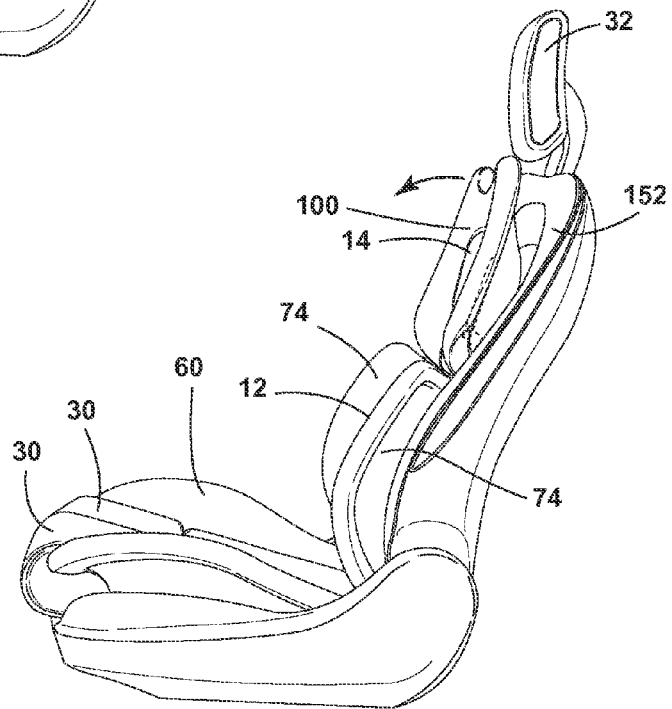
FIG. 9 is a side elevational view of an additional embodiment of the vehicle seating assembly of FIG. 8.

With reference now to FIGS. 3-5, the upper seatback 14 is pivotable forward and rearward about the pivot axis 16. The motor 94 is operably coupled with the arcuate back support bar 18 and configured to rotatably adjust the arcuate back support bar 18 and the upper portion of the passenger cushion assembly 140 forward and rearward relative to the lower portion. The linking member 96 operably couples the motor 94 with the end of the arcuate back support bar 18. The linking member 96 may include a direct gear connection between the motor 94 and the arcuate back support bar 18. Alternatively, the upper portion of the passenger cushion assembly 140, and specifically the flex member 76, may alternatively be pivoted via a manual gear assembly, as discussed in further detail herein. The upper portion is pivotal between a forward position, a rearward position, and various intermediate positions therebetween. When the upper seatback 14 is in the rearward position, the upper segment of the passenger support is substantially aligned with the seatback structure as a whole, as illustrated in FIG. 8. As the upper seatback 14 moves to the intermediate positions and further to the forward position, the upper segment of the passenger support tilts forward to provide additional support to the upper back of a passenger (see FIG. 9). Accordingly, the external peripheral gap 152 expands proximate the upper seatback 14 as the flex member 76 pivots forward to the forward position. It is contemplated that the vehicle seating assembly 10 may be configured to optionally pivot the upper seatback 14 from the rearward position to the intermediate positions and further to the forward position simultaneously as the seatback assembly 48 reclines from an upright position to a reclined position relative to the seat 60.

As shown in FIG. 4, the vehicle seating assembly 10 includes a motor brace 180 that operably couples the motor 94 with the seatback assembly 48. A lower end of the linking member 96 connects with the motor 94 and an upper end connects at a pivot junction 182, where the arcuate back support bar 18 couples with the brackets 112. Notably, the arcuate back support bar 18, and consequently the upper seatback 14, rotates about the pivot axis 16 located through a forward portion of the bracket 112. The linking member 96 is coupled with a worm gear that is operably coupled with the motor 94. The motor 94 operates to drive the linking member 96 up or down based upon the rotational direction of the motor 94. It is conceivable that the motor 94 may be replaced with a manually rotatable knob to cause the upper component to pivot about the arcuate back support bar 18. Further, it is conceivable that various alternative linkage arrangements, such as those that include a Bowden cable, may be used to rotate the arcuate back support bar 18 and pivot the upper seatback 14.

Figure 10:
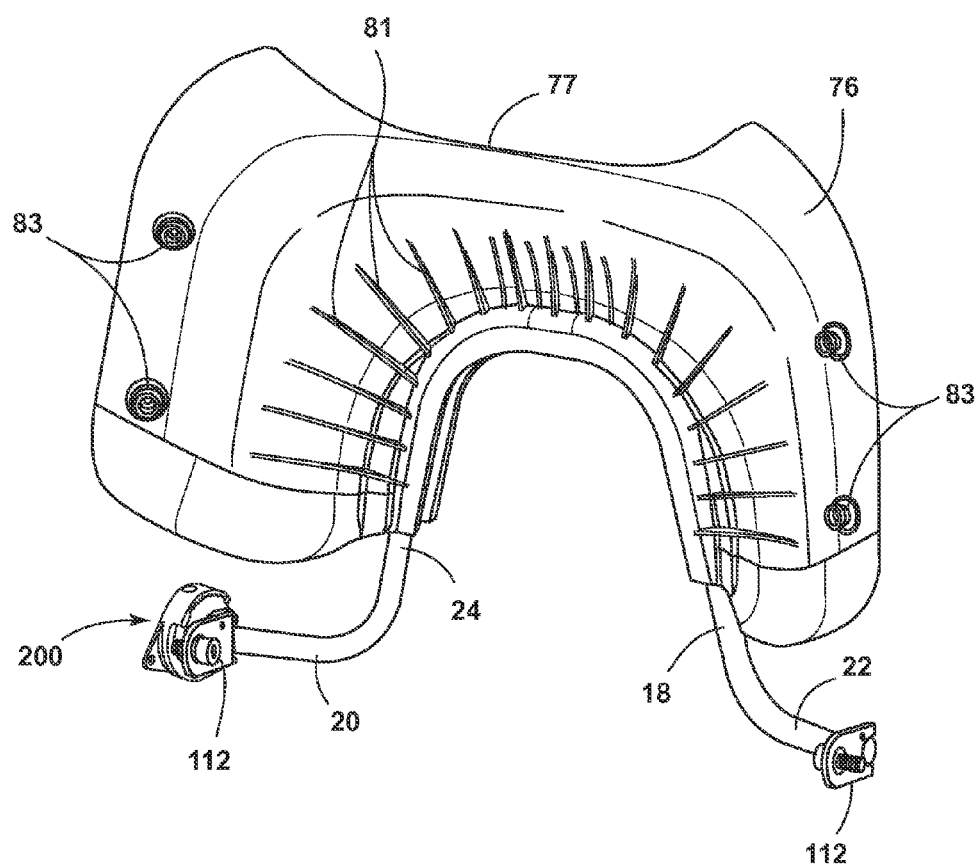
FIG. 10 is a top perspective view of one embodiment of a portion of an upper seatback of a vehicle seating assembly.

With reference now to FIG. 10, it is also contemplated that the upper seatback 14 may be adjusted manually rather than by an automated or motorized system. In the illustrated embodiment, the arcuate back support bar 18 is pivotally coupled at one of the first and second generally linear members 20, 22 and a first linear end is pivotally coupled with a manual articulation assembly 200 that is manually adjustable and configured to secure or lock the upper seatback 14 in a variety of positions relative to the lower seatback 12.

Figure 12:
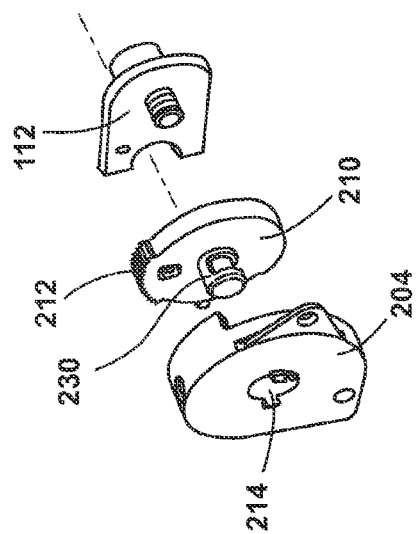
FIG. 12 is a top perspective view of a manual articulation assembly of the present disclosure partially disassembled and prior to connection with an arcuate back support bar.
Figure 13:
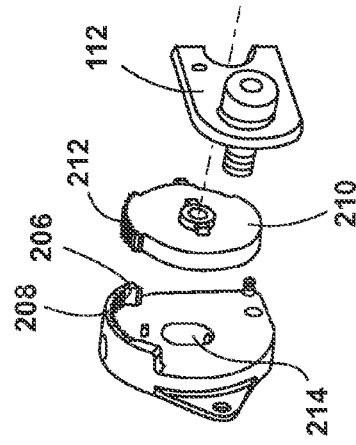
FIG. 13 is a side perspective view of the manual articulation assembly of FIG. 12.
Figure 11:
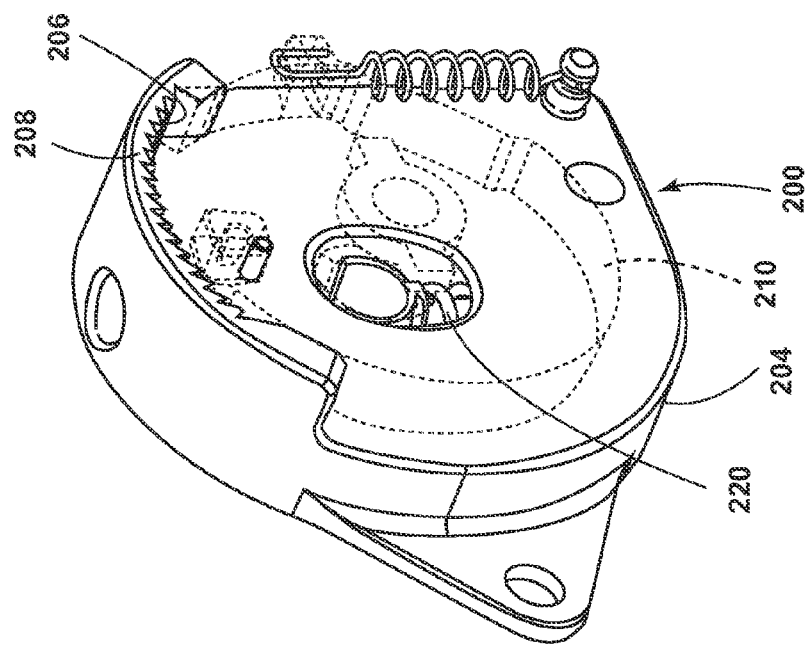
FIG. 11 is a top perspective view of one embodiment of a manual articulation assembly.

As shown in the embodiment illustrated in FIGS. 11-13, the manual articulation assembly 200 includes a housing 204 having cam engagement teeth 206 disposed on an inner wall 208 thereof. A positional cam 210 is disposed inside the housing 204 and includes complementary cam teeth 212 configured to engage with the cam engagement teeth 206 of the housing 204. The housing 204 includes a cam channel in the form of an elongate slot 214 and a cam channel spring member 220 that moves inside the elongate slot 214 to adjust the positional cam 210 in a vertical direction inside the housing 204. The cam channel spring member 220 extends around a guide shaft. A cam return spring 222 is coupled to a tab 224 on one end of the cam and configured to rotate the positional cam 210 to a zero degree or rearward position inside the housing 204. The elongate slot 214 extends vertically through a middle portion of the housing 204. A positional cam pin 230 extends into the elongate slot 214 that extends through the housing 204 and is linearly slidable in the cam channel. The positional cam pin 230 extends through the positional cam 210 and is operably coupled with one of the first and second generally linear members 20, 22 of the vehicle seating assembly 10. The cam channel spring member 220 forces the cam pin 230, and consequently, the positional cam 210, upward such that the cam engagement teeth 206 are engaged with the cam teeth 212. To rotate the positional cam 210 inside the housing 204, a user would push a lever coupled with the cam pin 230 downward to disengage the cam teeth 212. In use, the manual articulation assembly 200 is in a design position with the positional cam 210 in a fully rearward position inside the housing 204. In this position, the cam teeth 212 are in a fully rearward position and engaged with the cam engagement teeth 206 on the inside wall 208 of the housing 204 (see FIG. 14). A generally square-shaped guide slot 240 is disposed in an upper portion of the positional cam 210. The square-shaped guide slot 240 includes a guide pin 242 that extends therethrough. The guide pin 242 moves around the square-shaped guide slot 240 and helps guide the positional cam 210 as the positional cam 210 rotates from a fully rearward position to various intermediate positions, and ultimately terminates or stops at a fully forward position. The guide pin 242 rotates around a center island 244 that helps guide the pin 242 along the square-shaped guide slot 240. The guide pin 242 will come to rest at any of a variety of positions along the bottom portion of the square-shaped guide slot 240.

Figure 14:
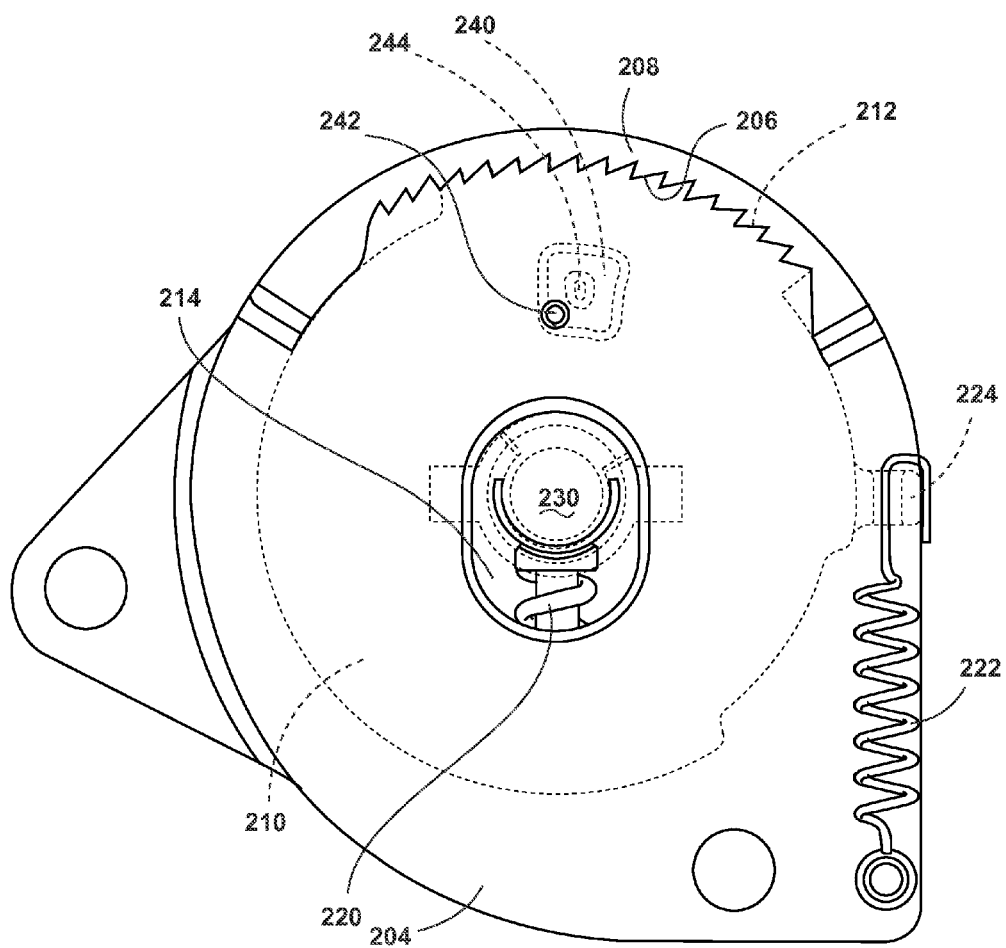
FIG. 14 is a side elevational view of one embodiment of a manual articulation assembly at a design angle of zero degrees incline.
Figure 14A:
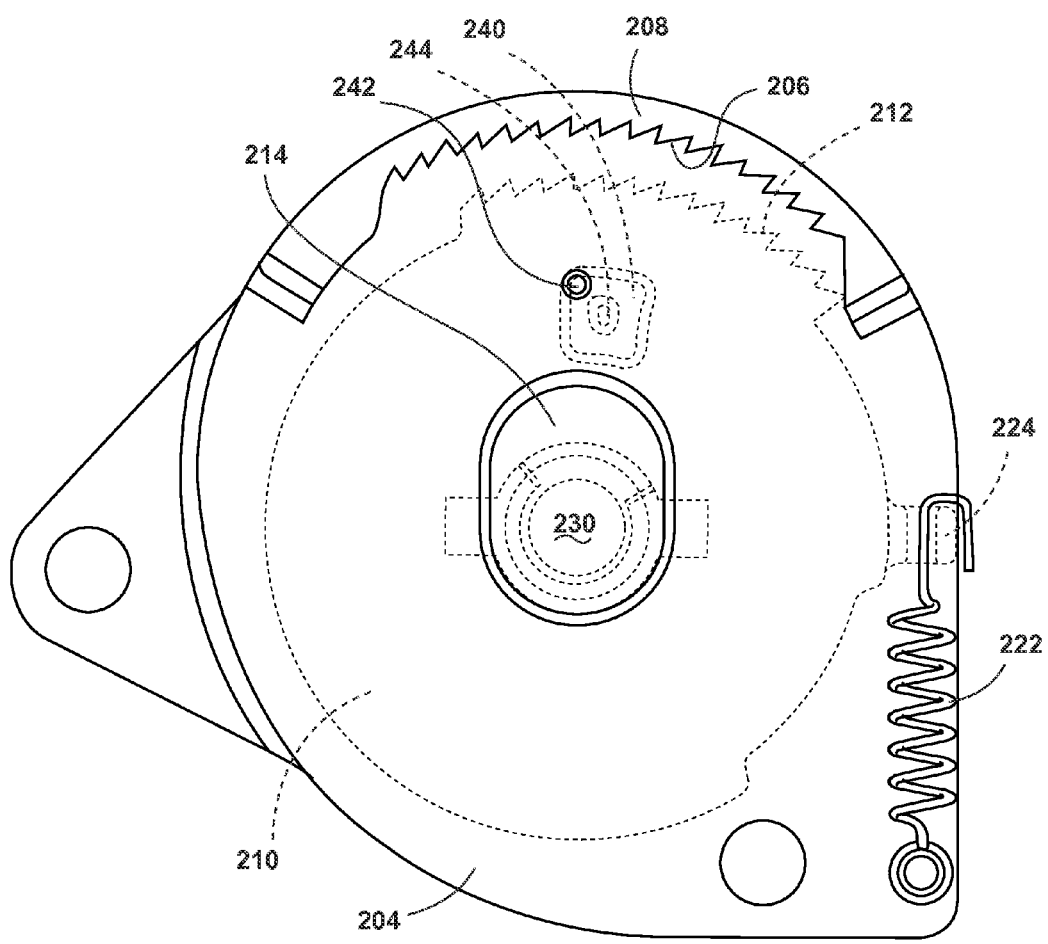
FIG. 14A is a side elevational view of the manual articulation assembly of FIG. 14 with the cam disengaged from the housing before rotation to a forward position.
Figure 14B:
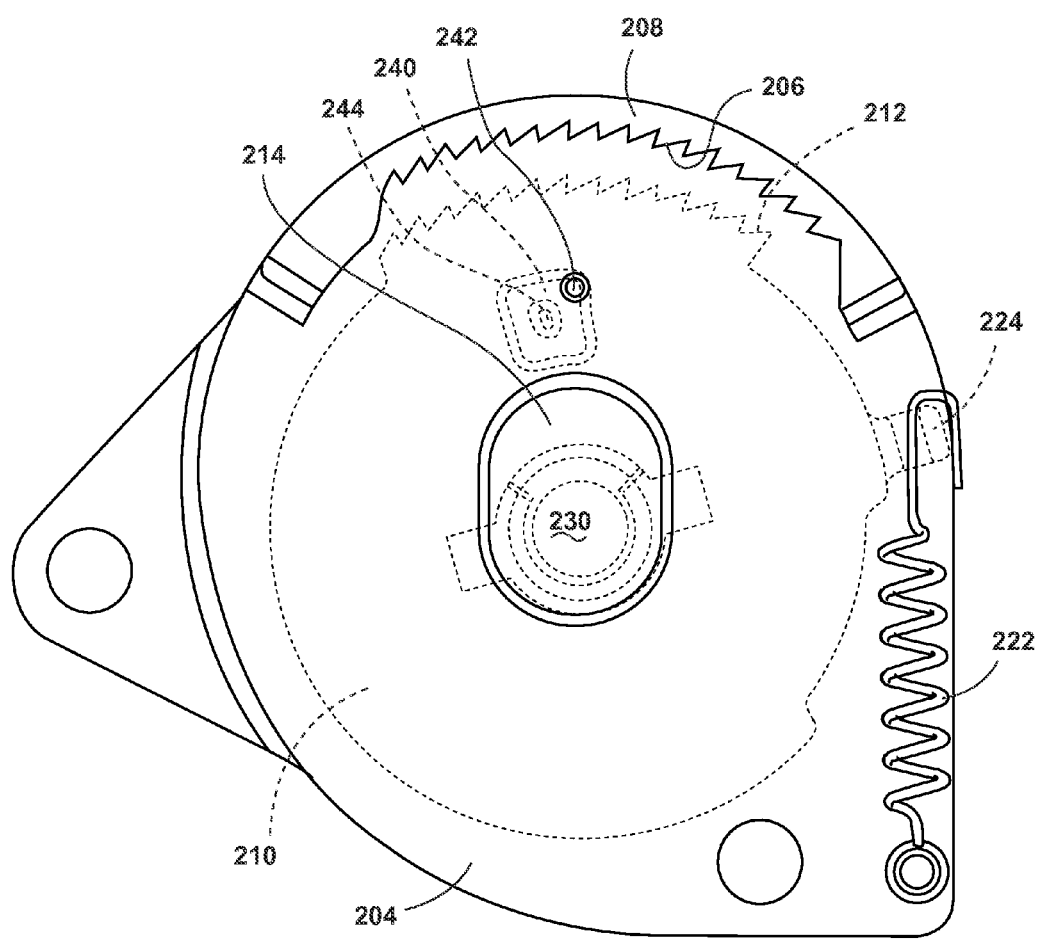
FIG. 14B is a side elevational view of the manual articulation assembly of FIG. 14 with the cam disengaged from the housing after rotation to a forward position.
Figure 17:
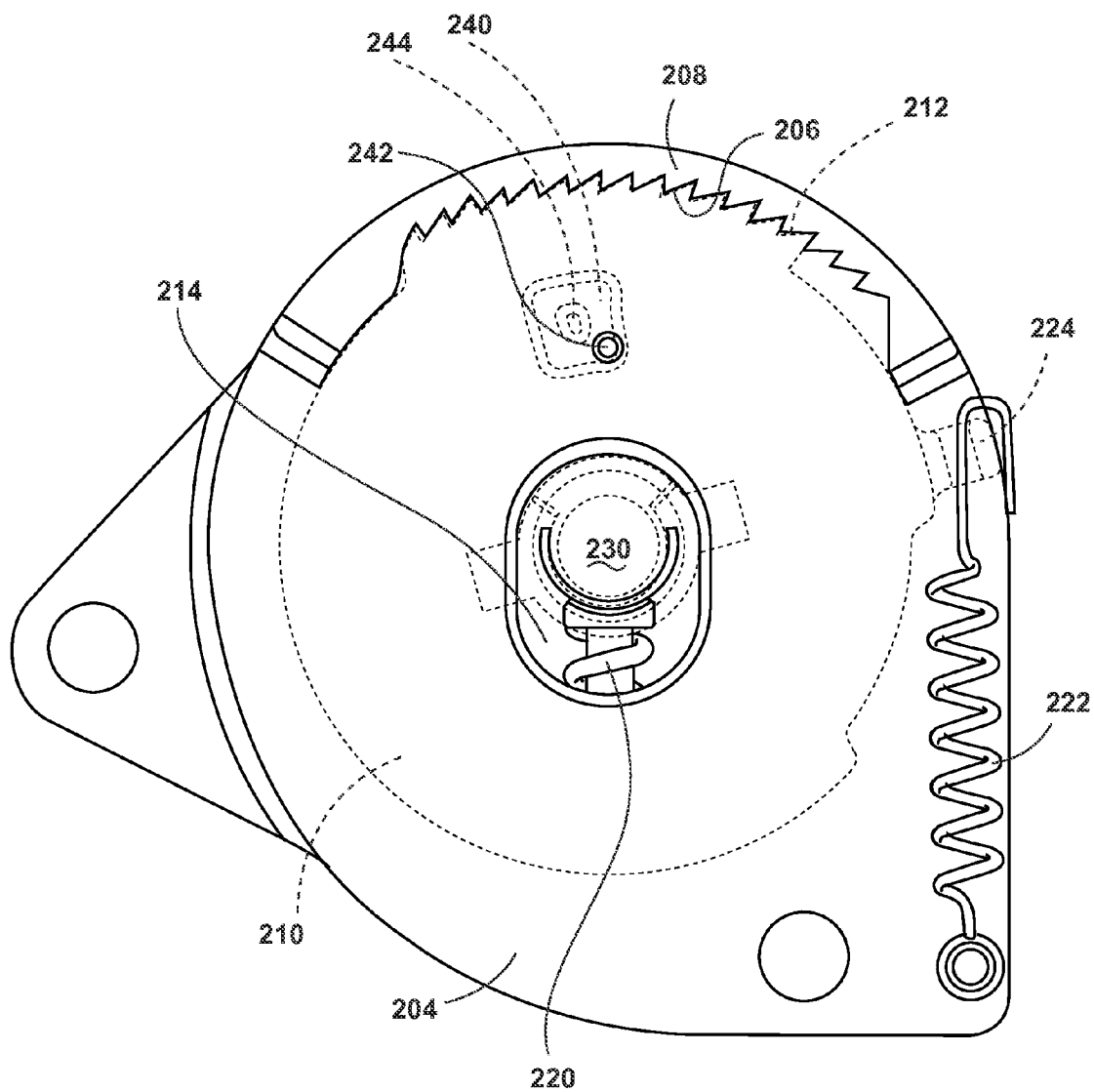
FIG. 17 is a side elevational view of the manual articulation assembly of FIG. 14 with the cam after engagement of the cam teeth with the cam engagement teeth of the housing at a 15 degree forward incline.
Figure 17A:
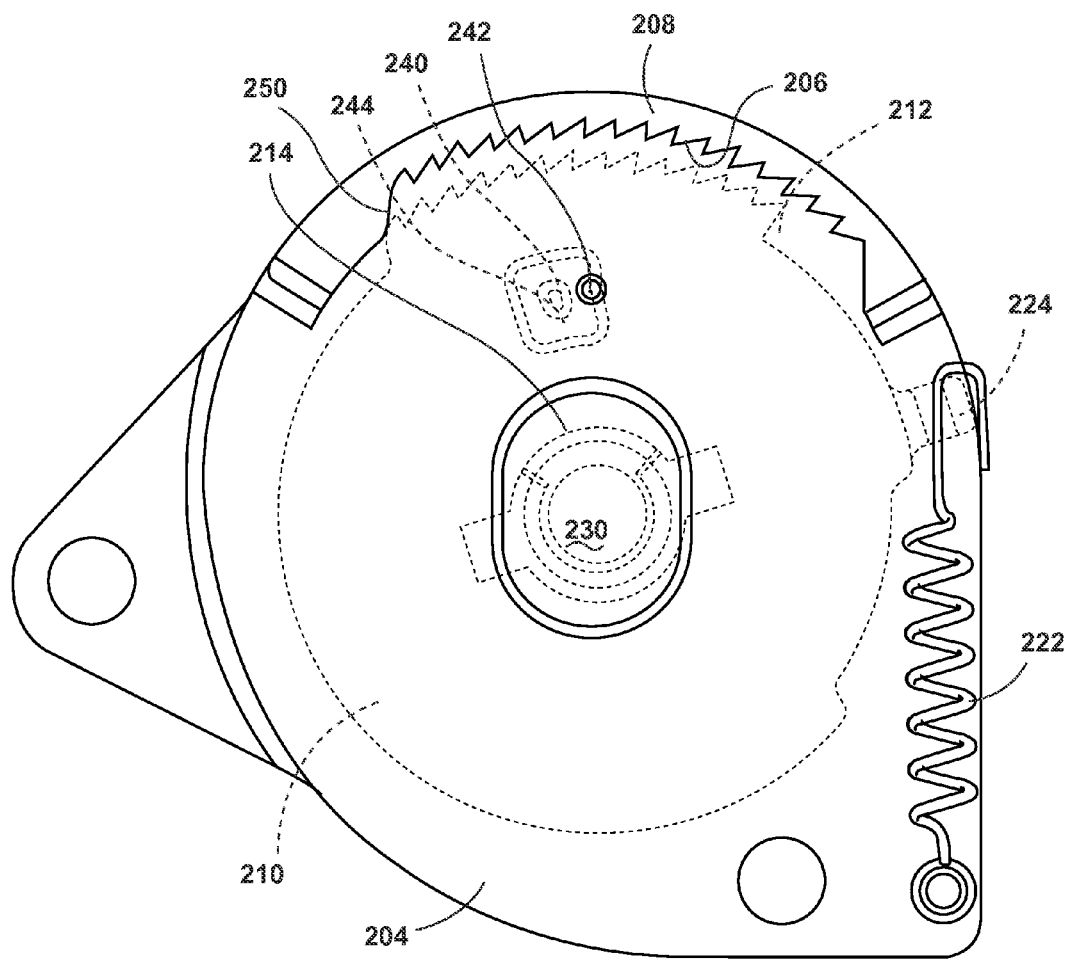
FIG. 17A is a side elevational view of the manual articulation assembly of FIG. 14 with the cam teeth disengaged from the cam engagement teeth in the housing after rotation to a forward position.
Figure 17B:
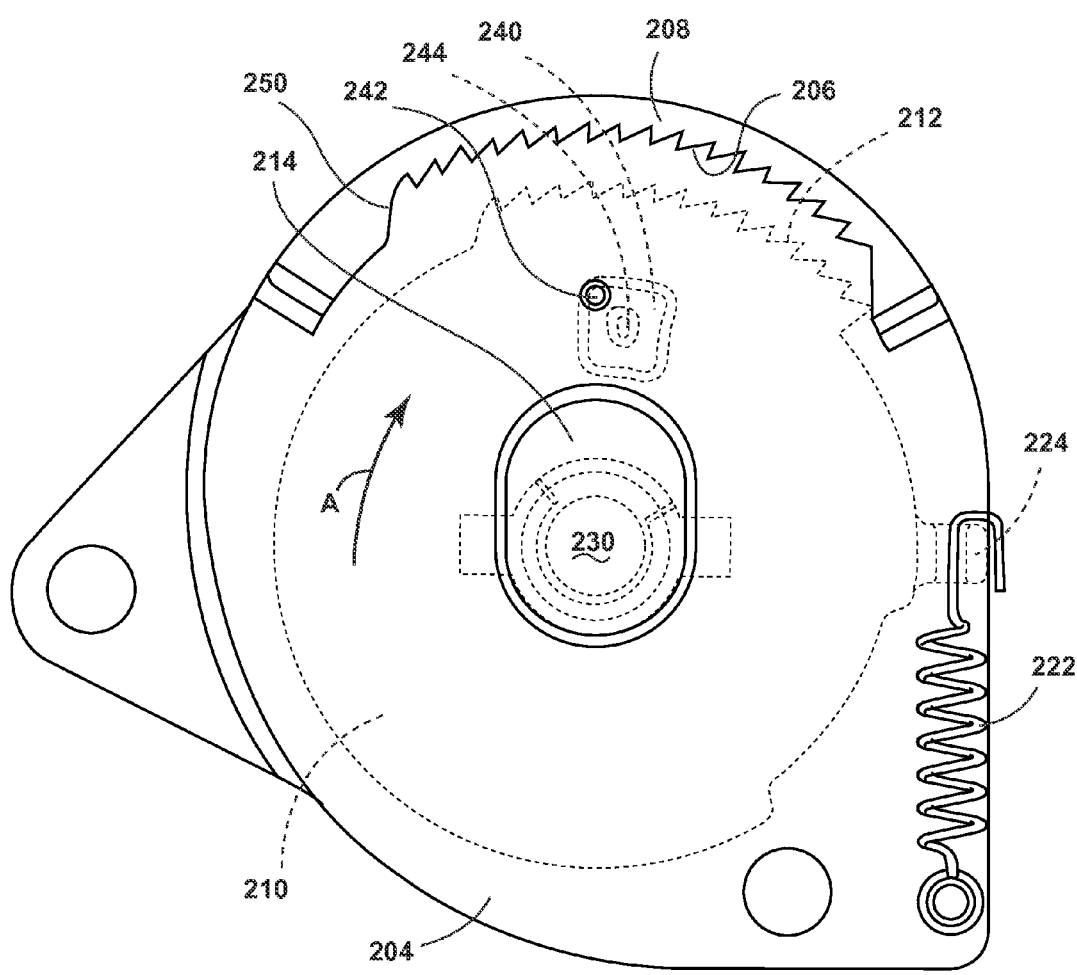
FIG. 17B a side elevational view of the manual articulation assembly of FIG. 14 after the cam has been reset to the design position.

With reference now to FIGS. 14A and 14B, in one embodiment, to affect movement of the upper seatback 14 forward, a lever on an external periphery of the vehicle seating assembly 10 that is coupled with the positional cam 210 is lowered, such that the cam teeth 212 of the positional cam 210 disengage the cam engagement teeth 206 on the inside wall 208 of the housing 204. The arcuate back support bar 18 may be spring-biased to a forward position and allowed to move a predetermined distance forward relative to the seatback assembly 48. The cam teeth 212 of the positional cam 210 are then allowed to re-engage the cam engagement teeth 206 as the passenger allows the positional cam 210 to again move to a raised position. Notably, the cam channel spring member 220 of the manual articulation assembly 200 has a stronger compression force than the tension force of the cam return spring 222. Accordingly, absent force applied by a passenger, the positional cam 210 will stay in the raised position. Further, it will be understood that the cam return spring 222 is designed to rotate the positional cam 210 rearward inside the housing 204. After the cam engagement teeth 206 re-engage with the cam teeth 212 on the inside wall 208 of the housing 204, the upper seatback 14 is now in a forward intermediate position. This same movement can be repeated to move the seatback to another forward intermediate position, or ultimately, to a fully forward position, as illustrated in FIG. 17. It is contemplated that the positional cam 210 may be positioned in the design position (FIG. 14), and be movable to a rear intermediate position of approximately 5 degrees (FIG. 15), a forward intermediate position of approximately 10 degrees (FIG. 16), and a fully forward position of approximately 15 degrees (FIG. 17). It will be appreciated by a person having ordinary skill in the art that the amount of incline can differ, depending on the desired use. The aforementioned inclination angles are intended to be examples only.

Figure 15:
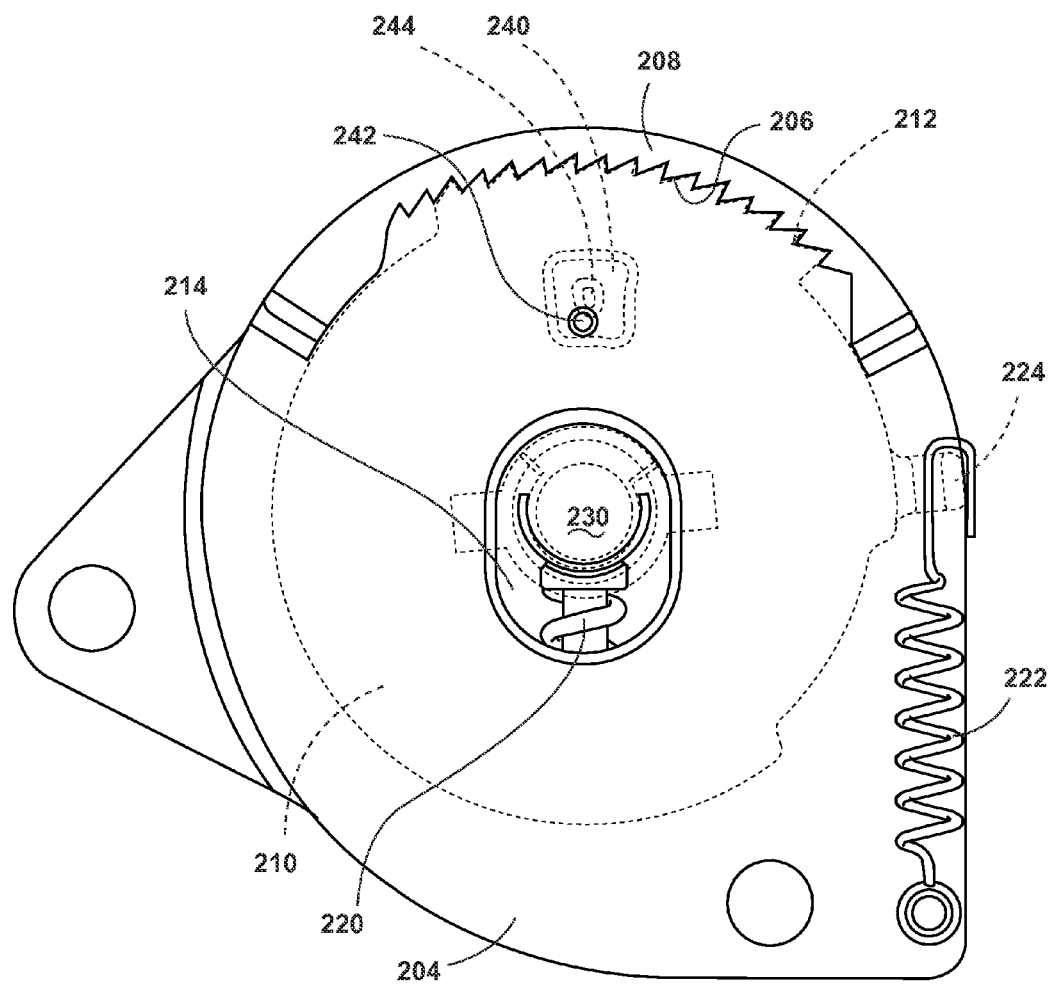
FIG. 15 is a side elevational view of the manual articulation assembly of FIG. 14 with the cam after engagement of the cam teeth with the cam engagement teeth of the housing at a five degree forward incline.
Figure 16:
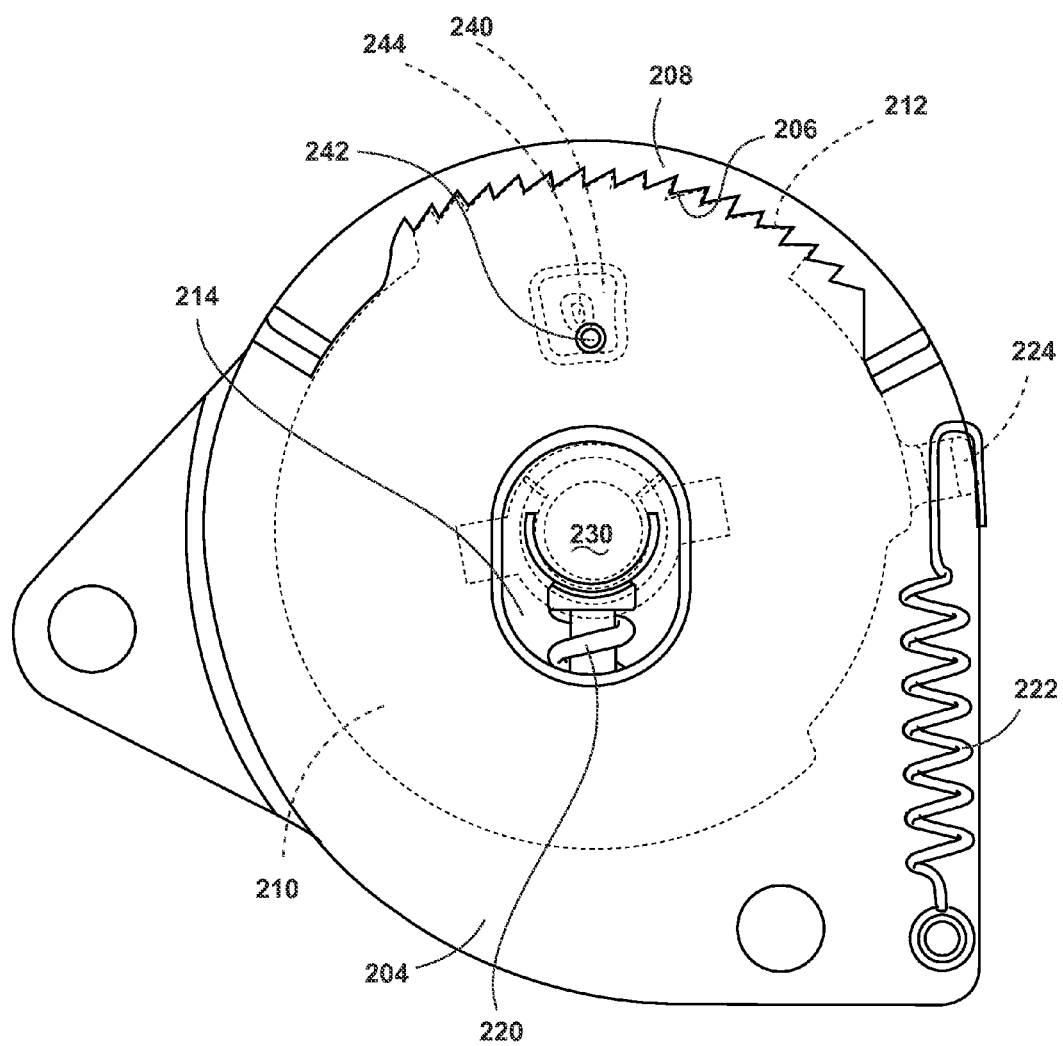
FIG. 16 is a side elevational view of the manual articulation assembly of FIG. 14 with the cam after engagement of the cam teeth with the cam engagement teeth of the housing at a 10 degree forward incline.

With reference again to FIGS. 14-17B, the manual articulation assembly 200 can include a ratcheting system that works as follows. Initially, as illustrated in FIGS. 11 and 14, the upper seatback 14 is in a design position at zero degrees inclination relative to the seatback assembly 48. From this position, a user can grasp the upper seatback 14 and urge the upper seatback 14 forward relative to the seatback assembly 48 such that the upper seatback 14 becomes inclined relative to the seatback assembly 48. As the upper seatback 14 is rotated forward, cam teeth 212 begin to ratchet forward. FIG. 15 illustrates the cam teeth 212 moving forward one position relative to the cam engagement teeth 206 such that the upper seatback 14 is now at a predetermined position, for example, five degrees forward, relative to the seatback assembly 48. The user may continue to urge the upper seatback 14 forward to further inclined positions (e.g., 10 degrees (FIG. 16)), or to a maximum inclination angle of the upper seatback 14 relative to the seatback assembly 48 as shown in FIG. 17 (e.g., 15 degrees).

With reference again to FIGS. 11-17, once the user has ratcheted the upper seatback 14 to the most forward position relative to the seatback assembly 48, the user cannot further urge the upper seatback 14 any further forward. To return the upper seatback 14 to the design or zero degree position, the user simply urges the upper seatback 14 even further forward from the furthest position forward as shown in FIG. 17, such that the positional cam 210 is urged downward by a forward slope 250 disposed adjacent the cam engagement 206 of the housing 204 against the upward spring bias of the cam channel spring member 220. Once the cam teeth 212 disengage from the cam engagement teeth 206, the cam return spring 222 rotates the positional cam 210 rearward in a clockwise direction in the direction of arrow A, thus resetting the positional cam 210 inside the housing 204 back to the design or zero degree position. The process can then be initiated again. The user can move the upper seatback 14 to a desired angled position relative to the seatback assembly 48.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
a lower seatback;
an upper seatback operably coupled to the lower seatback, wherein the upper seatback is pivotally mounted to the lower seatback at a pivot axis; and
a manual articulation assembly operably coupling the lower seatback with the upper seatback, the manual articulation assembly comprising:
a housing member including a cam channel and an inner wall with a plurality of engagement recesses; and
a positional cam including a cam pin engaged with the cam channel and an outer wall with a plurality of engagement teeth in removable engagement with the plurality of engagement recesses, wherein the cam pin is linearly slidable in the cam channel.

2. The vehicle seating assembly of claim 1, wherein the cam pin is linearly slidable between a lowered position that disengages the engagement teeth from the engagement recesses and a raised position that engages the engagement teeth with the engagement recesses.

3. The vehicle seating assembly of claim 1, wherein the manual articulation assembly is configured to position the upper seatback in one of a rear position, intermediate position and a forward position.

4. The vehicle seating assembly of claim 1, wherein the manual articulation assembly is operably coupled with an arcuate back support bar that supports the upper seatback.

5. The vehicle seating assembly of claim 4, wherein the arcuate back support bar that supports the upper seatback has a generally U-shaped construction.

6. A vehicle seating assembly comprising:
a lower seatback;
an upper seatback;
a manual articulation assembly pivotally coupling the lower seatback with the upper seatback, the manual articulation assembly comprising:
a housing member including a cam channel and an inner wall with a plurality of engagement recesses; and
a positional cam including a cam pin engaged with the cam channel and an outer wall with a plurality of engagement teeth engaged with the plurality of engagement recesses, wherein the cam pin is linearly slidable in the cam channel.

7. A vehicle seating assembly of claim 6, wherein the cam pin is linearly slidable between a lowered position that disengages the engagement teeth from the engagement recesses and a raised position that engages the engagement teeth with the engagement recesses.

8. The vehicle seating assembly of claim 6, wherein the manual articulation assembly is configured to position the upper seatback in one of a rear position, intermediate position and a forward position.

9. The vehicle seating assembly of claim 6, wherein the manual articulation assembly is operably coupled with an arcuate back support bar that supports the upper seatback.

10. The vehicle seating assembly of claim 9, wherein the arcuate back support bar that supports the upper seatback has a generally U-shaped construction.

11. A vehicle seating assembly comprising:
a lower seatback;
an upper seatback operably coupled to the lower seatback, wherein the upper seatback is pivotally mounted to the lower seatback at a pivot axis; and
a manual articulation assembly including a cam pin linearly slidable in a cam channel, and coupling the lower seatback with the upper seatback to temporarily lock the upper seatback at one of a plurality of angled positions relative to the lower seatback.

12. The vehicle seating assembly of claim 11, wherein the cam pin is linearly slidable between a lowered position that disengages engagement teeth from engagement recesses and a raised position that engages the engagement teeth with the engagement recesses.

13. The vehicle seating assembly of claim 11, wherein the manual articulation assembly is configured to position the upper seatback in one of a rear position, intermediate position and a forward position.

14. The vehicle seating assembly of claim 11, wherein the manual articulation assembly is operably coupled with an arcuate back support bar that supports the upper seatback.

15. The vehicle seating assembly of claim 14, wherein the arcuate back support bar that supports the upper seatback has a generally U-shaped construction.

* * * * *